Patented July 28, 1936

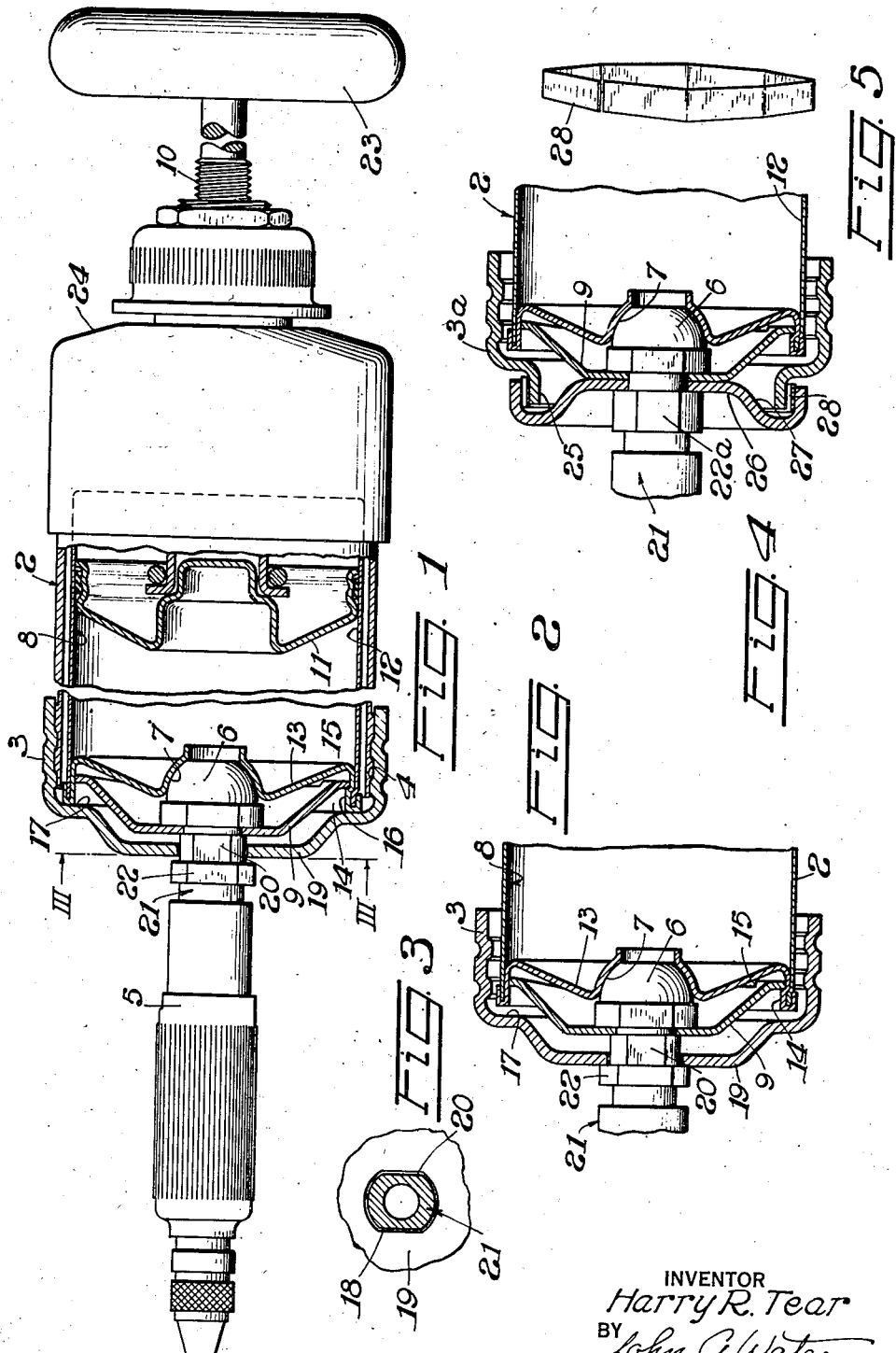

2,049,182

UNITED STATES PATENT OFFICE 2,049,182

LUBRICATING DEVICE

Harry R. Tear, Evanston, Ill., assignor to The Lubrication Corporation, Chicago, Ill., a corporation of Delaware Application September 7, 1934, Serial No. 743,123

10 Claims. (Cl. 221—47.4)

This application relates to improvements in lubricating devices, and more particularly to cartridge type lubricant guns, or dispensers, that may incorporate means for applying thrust to the cartridge piston for feeding lubricant from the cartridge into the pump cylinder of the gun or dispenser.

Lubricant guns and dispensers of the so-called "cartridge" types utilizing cartridges or factory-filled reservoirs that may be discarded after one use have been received with considerable favor by the public. The simplicity, ease and cleanliness with which grease and other lubricants may be handled and dispensed through such cartridges and the guns or pumps in which they may be used are very largely responsible for this favor.

In apparatus of this character it is common to employ a quick detachable lubricant-tight connection between the cartridge and the pump cylinder of the gun, or dispenser, in order to facilitate interchanging the cartridges. In general interchangeable cartridges for lubricant guns or dispensers, as described, comprise a cylindrical body, usually of sheet metal, a movable piston forming a closure for the rearward end of the body, and a fixed closure in the forward end thereof provided with an outlet opening through which the lubricant contents of the cartridge may be discharged. The quick detachable connection between cartridge and gun or dispenser in general may comprise a connector stud associated with the latter adapted to contact with a portion of the cartridge end closure, such as the wall of the lubricant outlet opening, thereby to provide a lubricant tight seal between the contacting surfaces thereof. Mechanical means, such as a bayonet connection, cooperating screw-threads and the like, operable to draw the cartridge and gun or dispenser relatively toward one another to maintain pressure between the lubricant sealing contact surfaces as above described, serves to complete the quick detachable connection whereby the gun or dispenser cartridge may be quickly and easily interchanged, at will, as during a complete lubricant servicing operation.

In such prior constructions the cartridge piston has been forced through the cartridge by a feed screw or the like to force lubricant from the cartridge into the gun or dispenser. The thrust of the feed screw has generally been borne by the connector stud and frequently has caused the thin metal of the cartridge end closure to be bent or otherwise damaged, thereby breaking the seal between the connector stud and the cartridge wall around the outlet opening. When this seal is broken lubricant from the cartridge leaks past it, thereby resulting in waste of lubricant and in deposition of lubricant on the outside of the device where it is not desired. This difficulty has been overcome in part by reinforcing the cartridge head or end closure but such a solution to the problem is expensive and prohibitive in view of the necessity of maintaining the cartridge cost at a minimum as the cartridge once emptied is intended to be discarded. My present invention overcomes this difficulty by relieving the relatively thin wall of the end closure of all counter-thrusts or reactions arising through the application of relatively high thrust to the cartridge piston.

It is, therefore, an object of my invention to provide an improved cartridge type gun, or dispenser, wherein all of the counter-thrust borne by the cartridge as the result of thrust applied to the cartridge piston against the lubricant contents of the cartridge is distributed uniformly throughout the entire end of the cartridge side wall at the folded seam between side wall and head portions.

Another object is to provide an improved cartridge type lubricant gun, or dispenser, wherein the diameter of the cartridge may be of maximum dimension with respect to the internal diameter of the cartridge receiving barrel of the gun or dispensing apparatus. This feature is largely attributable to the ability of the cartridge connecting instrumentality to shift laterally with respect to the axis of the barrel.

A further object is to provide an improved cartridge type lubricant gun, or dispenser, of the character described, wherein the cartridge mounting and supporting structure is self-compensating within reasonable limits with respect to variations in cartridge dimension and contour.

A further object is to provide an improved type of lubricant gun or dispenser, wherein uniform stress upon the cartridge side wall is maintained during piston operation thereby to aid in maintaining the true cylindrical contour of the cartridge.

Other objects, the advantages, and uses of the invention, will be, or should become, apparent after reading the following description and claims, and after consideration of the drawing forming a part of this application, wherein:

Fig. 1 is a side elevation with parts thereof broken away, illustrating a hand cartridge type lubricant gun constructed in accordance with the invention;

Fig. 2 is a fragmentary sectional view of the gun of Fig. 1 with the parts illustrated, as they appear prior to the application of thrust to the cartridge piston;

Fig. 3 is a sectional view along the line III—III of Fig. 1;

Fig. 4 is a view similar to Fig. 2 of another form of the invention; and

Fig. 5 is a perspective view of a part of the mechanism in Fig. 4.

I have selected for illustration herein a hand operated cartridge type lubricant gun such as may be used by small lubricant service stations, garages, and the like, and which is capable of receiving inter-changeable lubricant containing cartridges therein as a source of lubricant supply for the high pressure pump forming a part of the gun. The gun may comprise a barrel 2, having a detachable head 3, secured at the forward end thereof as by screw threads 4, a high pressure lubricant pump 5 of the push type associated with the head 3 and having a cartridge connector stud 6 fixed at the inlet thereof for sealing engagement with the wall of the outlet opening 7 of an interchangeable lubricant cartridge 8, a cartridge connector plate 9 fixed to the pump assembly immediately forward of the stud 6 and concentric therewith for engaging with and drawing the cartridge 8 toward the stud 6, and a hand operated feed screw 10 for applying thrust to the piston 11 of the cartridge, thereby to urge lubricant from within the cartridge through the stud 6 and into the cylinder of the pump 5, as during the charging stroke of the pump.

The cartridge 8 may comprise a cylindrical sheet metal side wall 12, a piston 11 and a sheet metal head 13 within which the outlet opening 7 is centrally located, the head being joined to the forward end of the side wall by a seam 14, thus to provide a lubricant-tight joint as well as a mechanical reinforcement for that portion of the cartridge. The connector plate 9 may be formed with bayonet slots 15 at its periphery, engageable with lugs 16 formed in the seam 14 of the cartridge so that upon relative rotation between cartridge and connector plate, the head 13 will be drawn toward the connector stud 6 to establish a lubricant-tight connection between the cartridge outlet wall and the cartridge connector stud.

In the device thus far described it will be apparent that thrust applied to the piston 11, as by the screw 10, carried by the barrel 2, must result in the application of the counter-thrust upon the head 13 of the cartridge at its point of engagement with the stud 6 and that even under ordinary operating conditions such thrust applied to the piston 11 may result in distortion to the cartridge head in an amount sufficient to cause leakage. Such distortion is bound to occur should the operator unintentionally increase the thrust applied to the piston 11 considerably above the amount actually required, as may be expected to occur in the every day use of the device by the ordinary mechanic.

The present invention removes, at once, this hazard of injury to the relatively fragile structure of the sheet metal cartridge and contemplates an arrangement wherein the head 3 of the barrel 2 has a floating connection with the pump assembly 5. This connection may consist in the provision of a non-circular opening 18 through the central portion 19 of the head 3 through which a non-circular and elongated portion 20 of the rearward end 21 of the pump 5 extends. While the head 3 is thus held against rotation with respect to the pump 5, it is free to move along the longitudinal axis of the pump between the cartridge connector plate 9 and a hexagonal flange 22 formed on the portion 21 of the pump an amount sufficient to permit the inner wall 17 of the head 3 to be drawn into uniform contact with the forward edge of the seam 14 of the cartridge when the screw 10 is operated, to advance the cartridge piston, as by turning the hand grip 23 therefor. Since the screw 10 is mounted upon the rearward end 24 of the barrel 2 all counter-thrust present as the result of direct thrust applied to the cartridge piston 11, must be borne by the seam 14. This simple and highly effective arrangement has the further advantage of compensating for slight variations in cartridge contour with respect to the inter-connection between the head and side wall of the cartridge and results in the limiting of mechanical thrusts applied to the cartridge head 13 solely to the normal drawing of the head toward the stud by virtue of the operation of the cartridge connector plate 9.

In Fig. 2 I have illustrated the parts as they appear prior to the take-up of lost motion between the head 3 and the seam 14 of the cartridge as the parts may appear prior to the operation of the screw 10 to urge the piston 11 forwardly. In Fig. 1 the parts appear as during the application of thrust to the piston 11.

In Fig. 4 I have illustrated another form of the invention wherein an annular member 3A is substituted for the head 3 of the gun and which is formed with a reduced annular and forwardly extending flange 25 at the inner edge thereof. A rigid disc 26 fixed to the pump assembly 5 between the hexagonal flange 22A and the connector plate 9 is formed with an annular recess 27 on its inner face within which the flange 25 is loosely received, thus to provide lost motion between the member 3A and the disc 26. In order that the member 3A may retain a central position upon the axis of the connector stud 6, a spacer member, preferably constructed of spring steel, may be located between the adjacent walls of the flange 25 and of the recess 27 as shown at 28 (see Fig. 5).

This form of the invention, while differing in structural details from that shown in Figs. 1 and 2, operates in precisely the same manner to distribute counter-thrust during operation of the cartridge piston 11 upon the outer end of the seam 14 of the cartridge therefore to preserve the pre-determined contour and operating characteristics of the cartridge head 13 in the manner described.

In both forms of the invention herein disclosed the slight side play between barrel and pump cylinder permits of the use of a cartridge of maximum diameter with respect to the internal diameter of the barrel. Furthermore, slight misalignment between cartridge and pump cylinder such as might arise through the formation of the connector plate 9, disposition of cartridge bayonet lugs and the like, is compensated for by the ability of the pump cylinder and associated parts to shift laterally and longitudinally with respect to the barrel.

While I have described in detail a specific embodiment of my invention, it is to be understood that I do not limit myself to such details except as set forth in the following claims.

I claim:

1. In combination, a lubricant pump including a cartridge connector stud, an interchangeable lubricant supply cartridge having a low pressure piston and an outlet opening, quick detachable means for mounting said cartridge rigidly upon said pump with the outlet opening of the cartridge in communication with said connector stud, and means movable with respect to said pump and engageable with the forward end of said cartridge and with said cartridge piston for applying thrust to said piston in the direction of the cartridge outlet opening.

2. In combination, a lubricant pump including a cartridge connector stud, an interchangeable lubricant supply cartridge having a low pressure piston and an outlet opening, quick detachable means for mounting said cartridge rigidly upon said pump with the outlet opening of the cartridge in communication with said connector stud, and means movable with respect to said pump and engageable with the forward end of said cartridge and with said cartridge piston for applying thrust to said piston in the direction of the cartridge outlet opening, said last named means including an enclosure for said cartridge.

3. In combination, a lubricant pump including a cartridge connector stud, an interchangeable lubricant supply cartridge, said cartridge having a cylindrical side wall and a head containing an outlet opening secured to the side wall by a lock seam, the opposite end of said cartridge being closed by a low pressure piston, quick detachable means for mounting said cartridge upon said pump with the outlet opening of the cartridge in communication with said connector stud, and means movable with respect to said pump and engageable with the said seam of said cartridge and with said cartridge piston for applying thrust to said piston in the direction of the cartridge outlet opening.

4. In a lubricating device, a barrel for receiving an interchangeable lubricant supply cartridge one wall of said cartridge being in the form of a movable piston, a lubricant feeding device, including a cartridge connector stud, said feeding device with said stud and said barrel being mounted for movement relative to one another along the longitudinal axis thereof with the stud located within the forward end of said barrel, means for drawing said stud into sealing engagement with the walls of the outlet opening of said cartridge, and means located upon the rearward end of the barrel for applying thrust to said cartridge piston in the direction of said stud thereby to place the lubricant in said cartridge under pressure and to urge the forward end of the cartridge into supporting contact with the inner and adjacent wall of said barrel.

5. In combination, a high pressure pump unit having a lubricant inlet member, an interchangeable lubricant cartridge having a piston, means providing a quick detachable connection for mounting said cartridge upon and in axial alignment with said pump unit, a member mounted for sliding movement relative to said pump unit along the axis thereof and adapted to bear upon the adjacent end of said cartridge, and means carried by said member for applying thrust to said cartridge piston in the direction of said pump unit.

6. In combination, a high pressure pump unit having a lubricant inlet member, an interchangeable lubricant cartridge having a piston, means providing a quick detachable connection for mounting said cartridge upon and in axial alignment with said pump unit, a member mounted for sliding movement relative to said pump unit along the axis thereof and adapted to bear upon the adjacent end of said cartridge, and means carried by said member for applying thrust to said cartridge piston in the direction of said pump unit, said member including means for enclosing said cartridge.

7. In combination, a high pressure pump unit having a cartridge engaging lubricant inlet member, an interchangeable lubricant cartridge having an outlet and a piston forming one end closure therefor, detachable connecting means for rigidly mounting said cartridge upon said pump unit with its outlet in registration with said inlet member, and means for applying compressive force between said cartridge piston and the edge of the forward end of said cartridge.

8. A lubricating device comprising a casing, a lubricant cartridge having an outlet and removably mounted in said casing, a piston in said cartridge, means associated with one end of said casing to apply pressure to said piston, the other end of the casing being so constructed and arranged as to support the cartridge, lubricant dispensing means having an inlet and movably mounted with respect to said casing, and means for securing said dispensing means to the cartridge with its inlet communicating with the cartridge outlet.

9. A lubricating device comprising, a casing, a lubricant cartridge having an outlet and a piston forming one end closure, means carried by one end of the casing to apply a thrust to said piston, the other end of the casing being so constructed and arranged as to engage an end of and support the cartridge, a lubricant pump having an inlet stud extending through and axially slidable with respect to said last named end of the casing, means for limiting axial movement of said pump, and means for rigidly securing the pump to the cartridge with the inlet stud in communication with the cartridge outlet.

10. A lubricating device comprising, a casing, a lubricant cartridge having an outlet and a piston forming one end closure, means carried by one end of the casing to apply a thrust to said piston, the other end of the casing being so constructed and arranged as to engage an end of and support the cartridge, a lubricant pump having an inlet stud extending through and axially slidable with respect to said last named end of the casing, and a connector plate rigidly secured to said pump and engageable with the side wall of the cartridge at one end thereof to hold the pump rigidly on the cartridge with the inlet stud in communication with the pump outlet.

HARRY R. TEAR.